Patented Oct. 16, 1934

1,976,920

UNITED STATES PATENT OFFICE 1,976,920

COLLOIDAL METALLIC BISMUTH AND METHOD OF PREPARING, PACKAGING, AND USING IT

Walter G. Christiansen, Glen Ridge, N. J., Alfred E. Jurist, Brooklyn, and Eugene Moness, Far Rockaway, N. Y., assignors to E. R. Squibb & Sons, Brooklyn, N. Y., a corporation of New York No Drawing. Application October 10, 1931, Serial No. 568,193

5 Claims. (Cl. 167—68)

This invention relates to colloidal metallic bismuth and compositions containing it adapted for therapeutic uses, and to methods of preparing these materials.

The invention is of particular value in affording a product which may be employed for devitalizing, that is destroying, inhibiting the growth of, or rendering harmless luetic spirochetes. The product and preparations including it may be employed, however, for other therapeutic purposes.

Colloidal metallic bismuth has been prepared heretofore by reducing glycerin solutions of bismuth nitrate under liquid petrolatum which protects the product against oxidation. It is, however, impossible to separate liquid petrolatum from the product, and the presence of glycerin tends to produce a sticky mass. Glycerin also is an irritant under the conditions of use of the product. Colloidal metallic bismuth prepared by the methods heretofore available has, therefore, undesirable characteristics which make it unsuitable for application to the purposes of the present invention.

It is the object of the invention to provide a simple and effective method of preparing colloidal metallic bismuth, and particularly a solution of colloidal metallic bismuth which can be utilized without initial drying, the product being substantially free from contaminating materials. Another object of the invention is to afford a product which may be recovered in dry, granular condition, capable of being dissolved to afford suitable solutions for therapeutic use.

Other objects and advantages of the invention will be better understood by reference to the following specification.

We have discovered that colloidal metallic bismuth can be prepared in a desirable form by reducing a solution of a bismuth compound containing a suitable sugar. Several sugars have been found to be effective for the purpose of the invention, including mannite, sorbitol and levulose. The colloidal bismuth which is separated by evaporation from such a solution is a dry granular material which is readily soluble in water. The absence of glycerin avoids stickiness and permits the completion of the reaction and the separation of a satisfactory product.

It is necessary to protect the solution from atmospheric oxidation and effect of carbon dioxide during the reduction, and for this purpose we prefer to cover the solution with a layer of a suitable material having characteristics which permit substantially complete removal thereof during the evaporation subsequent to reduction. Various materials may be used. The characteristics of a suitable oxygen-excluding liquid are:

1. Water insoluble.
2. Specific gravity: less than 1.
3. Chemically inert. This does not mean that the substance is incapable of undergoing chemical reactions but means that under the conditions of use it does not undergo chemical change.
4. Volatility.
   (a) The liquid may have a boiling point less than 100° C. at atmospheric pressure.
   (b) It may have a boiling point slightly above 100° C. at atmospheric pressure but be readily volatile in the steam which is formed during the evaporation of the dialyzed reaction mixture.

The "vaporizable liquid" of the accompanying claims is a liquid having these characteristics. The most satisfactory of these materials is benzol which is readily removed from the solution under the conditions hereinafter more fully described. Other suitable protection materials are toluol, xylol, ethyl ether, petroleum ether, and cyclohexane.

The reduction is accomplished most readily by preparing a water solution of mannite, sorbitol or levulose (fructose) and bismuth nitrate pentahydrate and adding it to a solution of a protecting colloid, such as acacia, in proper concentration. The solution is protected then by the layer of oxygen and carbon dioxide-excluding material such as benzol. The reducing agent, preferably a sodium hydrosulphite solution stabilized by the addition of a small amount of concentrated ammonia is added slowly while the mixture is thoroughly stirred.

The reduction to the free metal proceeds rapidly, and when completed the solution is distributed in dialyzing bags and dialyzed for about seventy-two hours with running water preferably freed from oxygen and carbon dioxide by previous boiling and cooling, at room temperature. The liquid in each bag must be protected with a layer of the oxygen-excluding material. When the dialysis is completed, as much as possible of the oxygen-excluding material is removed by means of a separatory funnel. The solution is then concentrated to about one-tenth of its original volume in a steam jacketed vacuum still. Any excess of the oxygen-excluding material is removed during the concentration.

The resulting solution can be packaged in suitable oxygen and carbon dioxide-excluding ampoules of glass or other suitable material for use without further treatment. Alternatively the colloidal metallic bismuth may be separated in dry form and then redissolved in water before it is packaged. The separation can be accomplished either by evaporating to dryness under vacuum or by precipitating by adding alcohol, filtering the precipitate and drying it under vacuum.

If the colloidal metallic bismuth is separated by either of the methods indicated, a dry, granular product is obtained containing 18 to 26% of bismuth and .5 to 1.5% of sulphur, depending upon the extent of the dialysis and of the drying of the precipitate. This dry granular material is readily soluble in water, and a solution thereof of proper concentration may be packaged in air-excluding ampoules of glass or other suitable material.

The method as described affords a simple and effective procedure whereby colloidal metallic bismuth may be obtained in a form which permits the preparation of satisfactory therapeutic products. The solution, whether obtained directly by evaporation or by evaporation to dryness and subsequent solution of the dry colloidal metallic bismuth, is substantially free from contaminating materials such as glycerin and petrolatum. The product is, therefore, more readily usable and therefore more desirable for its intended purpose.

As an example of the invention, the following will serve to illustrate the procedure: We prepare 440 cc. of a 13% mannite and 14% bismuth nitrate pentahydrate solution and add it to 7500 cc. of a 0.9% acacia solution. The resulting mixture is protected by a layer of an oxygen-excluding material such as benzol. We then slowly add to the mixture with thorough stirring 1500 cc. of a clarified 2% sodium hydrosulphite solution which has been stabilized by the addition of 10 cc. of concentrated ammonia. The stirring is continued until the reduction to the free colloidal metallic bismuth is completed.

The bismuth-acacia ratio needs to be very close to that which exists in the above mixture. This is necessary because the acacia is the protective colloid for the bismuth and if the bismuth-acacia ratio varies to any great extent the colloidal properties of the finished product will be affected.

The mannite-bismuth ratio, as given above, is very close to the most satisfactory ratio because the quantity of mannite used is close to the minimum necessary to obtain a satisfactory solution of the bismuth nitrate without hydrolysis. The concentration of mannite could probably be reduced from 13 to 12%. The concentration of mannite could be increased without any harmful effect. Thus, a 20% mannite solution would be just as satisfactory from the chemical standpoint but it would be impractical to add more mannite than is necessary. Similar proportions of sorbitol or levulose (fructose) can be used with satisfactory results. Lactose, dextrose and sucrose are not equivalent sugars and cannot be used successfully in the procedure described.

The total volume is close to 8000 cc. This volume should not be decreased because as the concentration of a reaction mixture increases during the production of a colloid the possibility of obtaining large particles is increased. The volume of water can be increased as much as one desires. However, the use of 16,000 instead of 8,000 cc. does not seem to improve the quality of the colloid which we have prepared and it is impractical to use larger volumes than are necessary.

The quantity of hydrosulphite is based on the reducing power of the latter and is just sufficient to obtain the desired reduction. One could use more but there is no advantage in doing so and the amount of material which would have to be removed upon dialysis would be increased. We use the sodium hydrosulphite in 2% aqueous solution. A more concentrated solution, for example 10%, could be used but it is necessary to add the hydrosulphite gradually so as to avoid large local concentrations. The gradual addition is easier to accomplish with a 2% solution than with a 10% solution.

The 10 cc. of concentrated ammonia used to stabilize the hydrosulphite solution can be varied, but it is undesirable to use more ammonia than is necessary because it is undesirable to increase the alkalinity of the reduction mixture; the ammonia which we use is probably all neutralized with sulphites from hydrosulphite before any injury to the colloid can occur.

The solution, still protected by the oxygen-excluding layer, is then distributed to the dialyzing bags and is dialyzed for about seventy-two hours with running water at room temperature. Each bag should have a layer of the oxygen-excluding material to avoid possible oxidation of the product. After dialysis is completed, the oxygen-excluding material is separated as completely as possible in a separatory funnel. The solution is then transferred to a steam jacketed vacuum still and concentrated to about one-tenth of its original volume. The excess of the oxygen-excluding material is removed with the steam evolved during the concentration.

The resulting 10% solution or a solution secured by further concentration under vacuum can be packaged anaerobically in suitable ampoules which preserve the product against atmospheric oxidation until it is to be used.

The dry product can be obtained, for example, by subjecting the 10% solution obtained as previously described to suitable vacuum at room temperature until the product can be partially powdered. The drying can then be finished under vacuum over phosphorous pentoxide ($P_2O_5$).

Alternatively the colloidal metallic bismuth can be precipitated from the 10% solution by adding an excess of ethyl alcohol thereto. This affords a more expeditious procedure, since the precipitate may be separated readily from the solution by filtering and then dried under vacuum at about 25° C. over phosphorous pentoxide.

The dry product in the form of a finely divided grayish black solid can be redissolved in water to produce solutions of the desired concentration for immediate use or may be packaged in oxygen-excluding ampoules and thus preserved for future use.

The procedure as described produces a uniform colloid in which the particle size is small. The solution is free from any second liquid phase such as organic material of the liquid petrolatum type and the colloidal solution is stable. Ampouled solution has been kept in the laboratory for over one year without evidence of deterioration. The biological work has also demonstrated that an excellent product from the standpoint of colloidal properties is obtained.

The solution of colloidal metallic bismuth may be administered intramuscularly, following the usual technique.

Although the example illustrates the best known procedure for the preparation of the product, various changes may be made in the details of proportions and of the materials employed. Thus, bismuth chloride or bismuth tartrate can replace bismuth nitrate. In place of mannite, similar carbohydrates can be used. Acacia can be replaced by other, preferably non-nitrogenous, protecting colloids. The proportions stated are those best adapted for the process, but wide variation is possible. Particularly, an excess of any of the materials is not generally harmful, but it is uneconomic. The invention is not, therefore, limited to such details but comprehends a procedure including the use of mannite or its equivalents in the initial solution and the employment of oxygen-excluding materials such as benzol and the equivalents therefor which permit the removal of such materials during the evaporation of the solution after the reduction of the colloidal metallic bismuth. The invention further comprehends the concentrated solution of colloidal metallic bismuth, free from contaminants such as glycerin, petrolatum and other impurities, and a finely divided solid product consisting of colloidal metallic bismuth likewise free from contaminating materials, and packaged anaerobically to ensure the maintenance of such solutions in condition to afford the desired therapeutic results.

The term "mannite" in the accompanying claims includes the equivalent sugars sorbitol and levulose (fructose). The term "inert" is used in the accompanying claims to apply to substances which, under the conditions of use, do not undergo chemical change.

Various changes may be made, therefore, without departing from the invention or sacrificing any of the advantages thereof.

We claim:

1. The method of preparing colloidal metallic bismuth which comprises reducing a bismuth compound in a water solution containing mannite and a protecting colloid under a layer of an inert, water-immiscible, vaporizable, oxygen-excluding liquid, dialyzing the solution and evaporating to remove water and the oxygen-excluding liquid.

2. The method of preparing colloidal metallic bismuth which comprises reducing a bismuth compound in a water solution containing mannite and a protecting colloid under a layer of an inert, water-immiscible, vaporizable, oxygen-excluding liquid, dialyzing the solution, evaporating to remove water and the oxygen-excluding liquid, precipitating the colloidal metallic bismuth, and separating and drying the precipitate.

3. The method of preparing colloidal metallic bismuth which comprises reducing a bismuth compound in a water solution containing mannite and a protecting colloid under a layer of an inert, water-immiscible, vaporizable, oxygen-excluding liquid, dialyzing the solution, evaporating to remove water and the oxygen-excluding liquid, separating and drying the colloidal metallic bismuth and redissolving the bismuth to produce a therapeutic solution.

4. The method of preparing colloidal metallic bismuth which comprises reducing a bismuth compound in a water solution containinng mannite and a protecting colloid under a layer of benzol, dialyzing the solution and evaporating to remove water and benzol.

5. The method of preparing colloidal metallic bismuth which comprises reducing a bismuth compound in a water solution containing mannite and a protecting colloid under a layer of benzol, dialyzing the solution, evaporating to remove water and benzol, precipitating the colloidal metallic bismuth, and separating and drying the precipitate.

WALTER G. CHRISTIANSEN.
EUGENE MONESS.
ALFRED E. JURIST.